(12) United States Patent
Wilson

(10) Patent No.: US 11,906,192 B2
(45) Date of Patent: *Feb. 20, 2024

(54) HEATING, VENTILATION, AND AIR CONDITIONING CONTROL SYSTEM

(71) Applicant: Johnson Controls Technology Company, Auburn Hills, MI (US)

(72) Inventor: Stephen C. Wilson, Oklahoma City, OK (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 532 days.

This patent is subject to a terminal disclaimer.

(21) Appl. No.: 16/953,122

(22) Filed: Nov. 19, 2020

(65) Prior Publication Data

US 2021/0140650 A1 May 13, 2021

Related U.S. Application Data

(63) Continuation of application No. 15/897,890, filed on Feb. 15, 2018, now Pat. No. 10,845,064.

(Continued)

(51) Int. Cl.
*G05B 19/042* (2006.01)
*F24F 11/873* (2018.01)
(Continued)

(52) U.S. Cl.
CPC ............ *F24F 11/873* (2018.01); *F24F 11/32* (2018.01); *G01J 5/0044* (2013.01);
(Continued)

(58) Field of Classification Search
CPC ...................... G05B 19/042; G05B 2219/2614
See application file for complete search history.

(56) References Cited

U.S. PATENT DOCUMENTS 3,654,431 A 4/1972 Brooks et al.
5,212,763 A 5/1993 Arold et al.
(Continued)

FOREIGN PATENT DOCUMENTS

CA 2957726 A1 3/2016
CA 3043996 A1 2/2018
(Continued)

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Michael W Choi
(74) *Attorney, Agent, or Firm* — Fletcher Yoder P.C.

(57) ABSTRACT

A heating, ventilation, and air conditioning (HVAC) system. The HVAC system includes a sensor that detects a temperature of a heater of a heating component and emits a signal indicative of the temperature. A flow management device controls a flow of electricity or fuel from a power source to the heating component. A controller receives the signal from the sensor and operates the flow management device to block the flow of electricity or fuel to the heating component when the signal is indicative of the temperature being above a set point.

20 Claims, 7 Drawing Sheets

Related U.S. Application Data

(60) Provisional application No. 62/459,458, filed on Feb. 15, 2017.

(51) Int. Cl.
　　*G01J 5/00*　　　(2022.01)
　　*G08B 21/18*　　(2006.01)
　　*F24F 11/32*　　 (2018.01)
　　*F24F 110/30*　　(2018.01)
　　*F24F 110/40*　　(2018.01)
　　*F24F 140/20*　　(2018.01)

(52) U.S. Cl.
　　CPC .......... *G05B 19/042* (2013.01); *G08B 21/182* (2013.01); *F24F 2110/30* (2018.01); *F24F 2110/40* (2018.01); *F24F 2140/20* (2018.01); *G05B 2219/2614* (2013.01)

(56) References Cited

U.S. PATENT DOCUMENTS

| | | | |
|---|---|---|---|
| 5,372,120 | A | 12/1994 | Swilik, Jr. et al. |
| 5,377,909 | A | 1/1995 | Kirkpatrick |
| 6,355,913 | B1 | 3/2002 | Authier et al. |
| 6,444,986 | B1 | 9/2002 | Disser |
| 7,119,308 | B2 | 10/2006 | Kopel |
| 7,279,662 | B2 | 10/2007 | Ryu et al. |
| 8,693,855 | B2 | 4/2014 | Potter et al. |
| 9,341,391 | B2 | 5/2016 | Stebbins et al. |
| 9,447,985 | B2 | 9/2016 | Johnson |
| 10,094,591 | B2 | 10/2018 | Garloch et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2006/0266348 | A1 | 11/2006 | Jauch, Jr. et al. |
| 2014/0262134 | A1* | 9/2014 | Arensmeier ............. F24F 11/36 165/11.2 |
| 2015/0159887 | A1 | 6/2015 | Kadah et al. |
| 2015/0204581 | A1 | 7/2015 | Krystad et al. |
| 2017/0138612 | A1* | 5/2017 | Kaiser ....................... F24H 3/06 |
| 2017/0167757 | A1 | 6/2017 | Connell et al. |
| 2018/0135869 | A1* | 5/2018 | Fard ........................ F24D 12/02 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

(56) References Cited

OTHER PUBLICATIONS

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

\* cited by examiner

HEATING, VENTILATION, AND AIR CONDITIONING CONTROL SYSTEM

CROSS-REFERENCE TO RELATED APPLICATION

This application is a continuation of U.S. patent application Ser. No. 15/897,890, entitled "HEATING, VENTILATION, AND AIR CONDITIONING CONTROL SYSTEM," filed Feb. 15, 2018, which claims priority to and the benefit of U.S. Provisional Application No. 62/459,458, entitled "INFRARED SAFETY DEVICE FOR GAS AND ELECTRIC HEATING," filed Feb. 15, 2017, each of which is hereby incorporated by reference in its entirety for all purposes.

BACKGROUND

The disclosure relates generally to HVAC systems.

Heating, ventilation, and air conditioning (HVAC) systems cool enclosed spaces by exchanging energy between a refrigerant and air. HVAC systems do this by circulating a refrigerant between two heat exchangers commonly referred to as an evaporator coil and a condenser coil. As refrigerant passes through the evaporator coil and the condenser coil, the refrigerant either absorbs or discharges thermal energy. More specifically, as air passes over the evaporator coil, the air cools as it loses energy to the refrigerant passing through the evaporator coil. In contrast, the condenser enables the refrigerant to discharge heat into the atmosphere. Inasmuch as refrigerant leaks compromise system performance or result in increased costs, it is desirable to provide detection and response systems and methods for the HVAC system to reliably detect and respond to any refrigerant leaks of the HVAC system.

SUMMARY

The present disclosure relates to a heating, ventilation, and air conditioning (HVAC) system. The HVAC system includes a sensor that detects a temperature of a heater of a heating component and emits a signal indicative of the temperature. A flow management device controls a flow of electricity or fuel from a power source to the heating component. A controller receives the signal from the sensor and operates the flow management device to block the flow of electricity or fuel to the heating component when the signal is indicative of the temperature being above a set point.

The present disclosure also relates to a heating, ventilation, and air conditioning (HVAC) system. The HVAC system includes a sensor that detects a temperature of a heat exchanger in a furnace system and emits a signal indicative of the temperature. A switch or valve that limits a flow of fuel to the furnace system. A controller that receives the signal indicative of the temperature and activates the switch or valve to limit the flow of the fuel to the furnace system in response to the signal being indicative of the temperature exceeding a threshold value.

The present disclosure also relates to a heating ventilation and air conditioning (HVAC) system. The HVAC system includes a sensor that detects a temperature of an HVAC component and emits a signal indicative of the temperature. A controller receives the signal indicative of the temperature and transmits a signal to block the flow of fuel or electricity to the HVAC system in response to the temperature being in excess of a threshold temperature.

DRAWINGS

DETAILED DESCRIPTION

Embodiments of the present disclosure include an HVAC control system that reduces and/or blocks combustion of a refrigerant. The HVAC control system may include one or more infrared sensors that detect a temperature in a furnace system and communicate data collected by the one or more sensors to a controller. The controller may then compare a signal indicative of the temperature to a threshold temperature. If the temperature is above a threshold temperature, the controller may activate one or more switches to turn off the flow of electricity and/or gas, such as natural gas, to the furnace system. By blocking the flow of electricity and/or gas to the furnace system, the HVAC control system reduces the temperature of the furnace system and thus blocks combustion of the refrigerant. In some embodiments, the HVAC control system may also include refrigerant sensors that detect leaking refrigerant and communicate the detection to the controller. In response, the controller activates one or more switches to turn off the flow of electricity and/or gas to the furnace system to block combustion of the refrigerant. In still other embodiments, the HVAC control system may include airflow sensors that detect airflow flowrate through the furnace system. The controller compares a signal indicative of the flowrate to a threshold flowrate. If the flowrate is below a threshold flowrate, the controller may activate one or more switches to turn off the flow of electricity and/or gas, such as natural gas, to the furnace system. Low airflow may indicate a lack of heat transfer from the furnace system, which may enable the furnace system to increase in temperature above a threshold temperature. Accordingly, by shutting down the flow of electricity and/or gas to the furnace system, the HVAC control system may block combustion of the refrigerant from an overheated furnace component.

Figure 1:
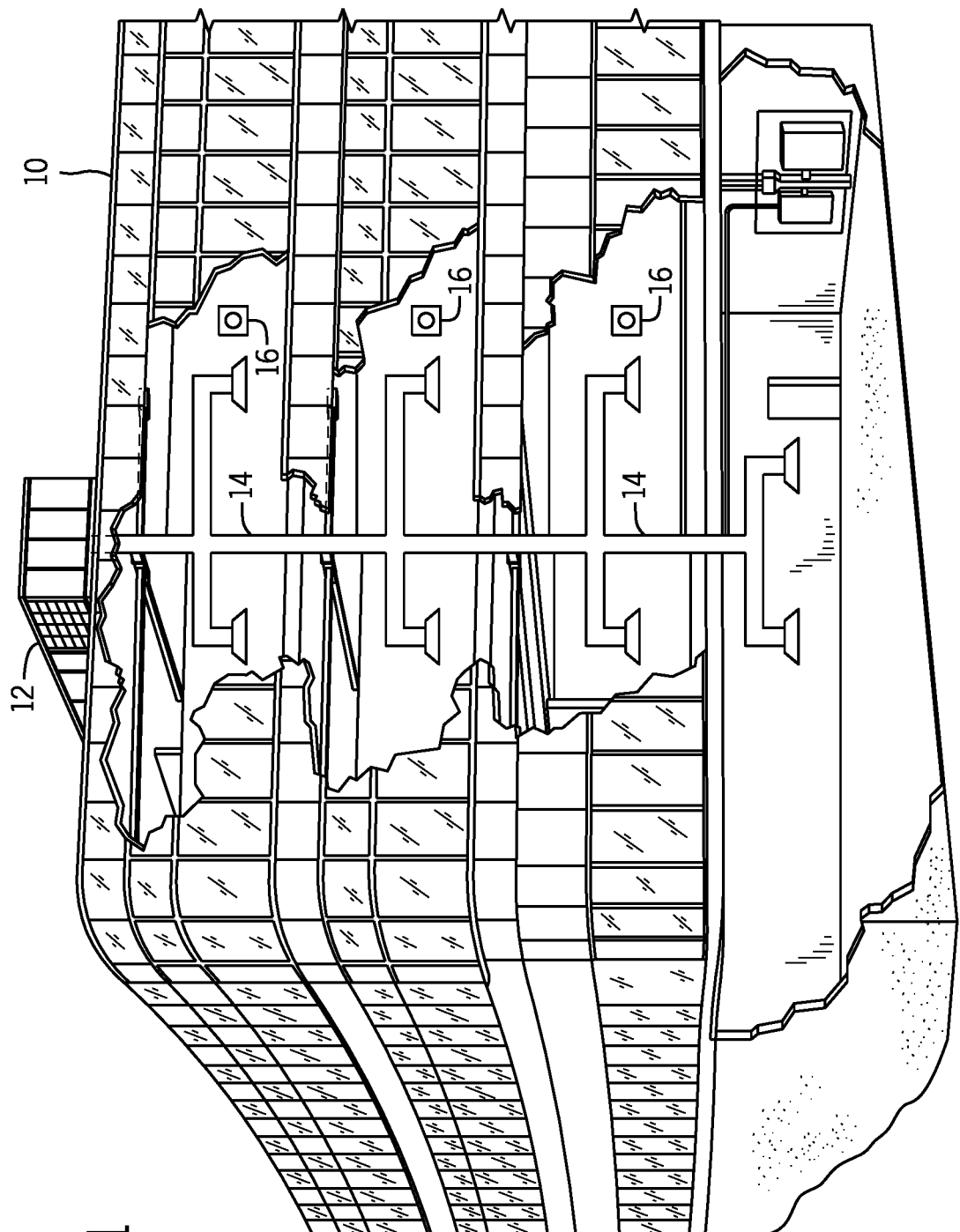
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air-cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
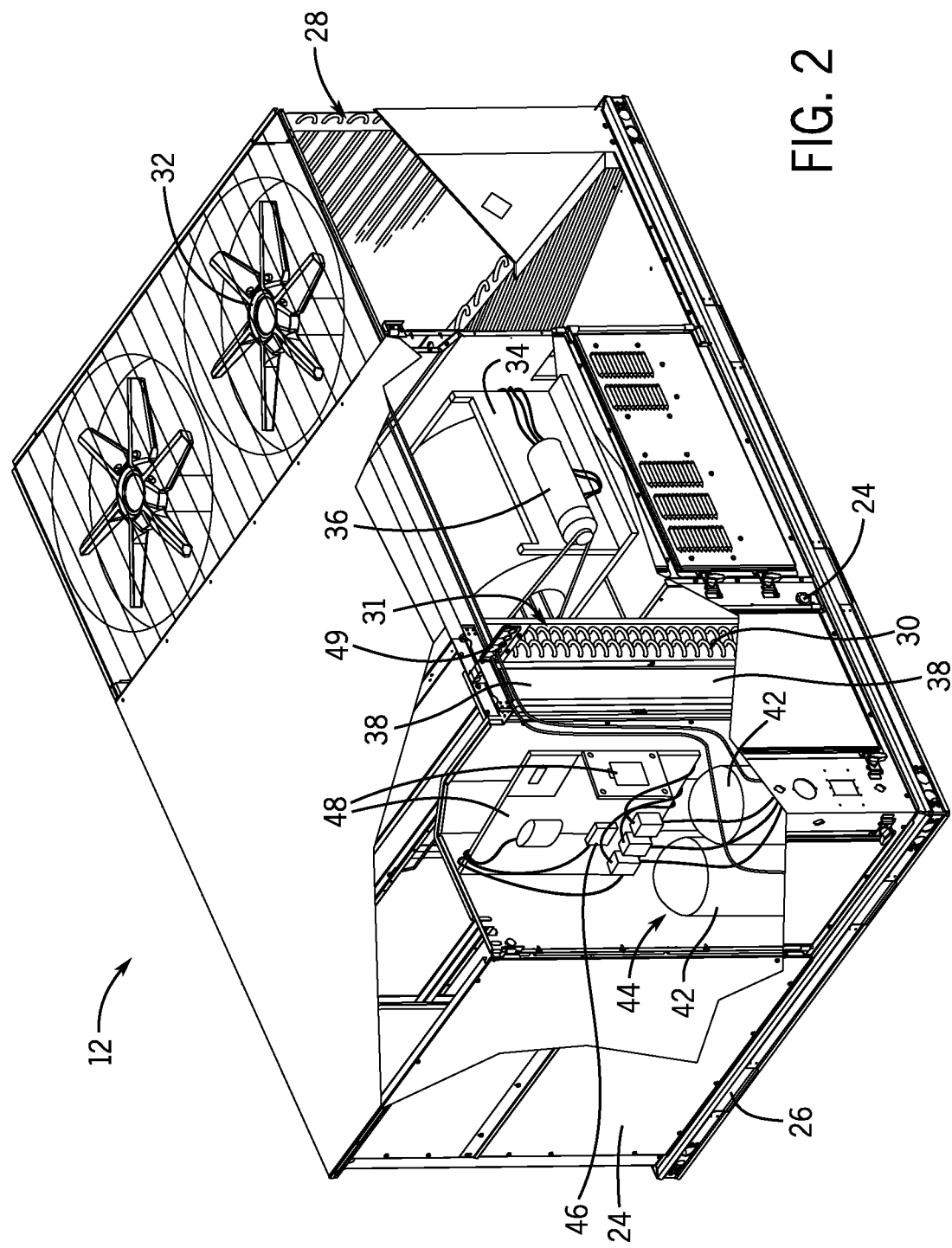
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive him arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor control switches. Wiring 49 may connect the control board 48 and the terminal block 46 to the equipment of the HVAC unit 12.

Figure 3:
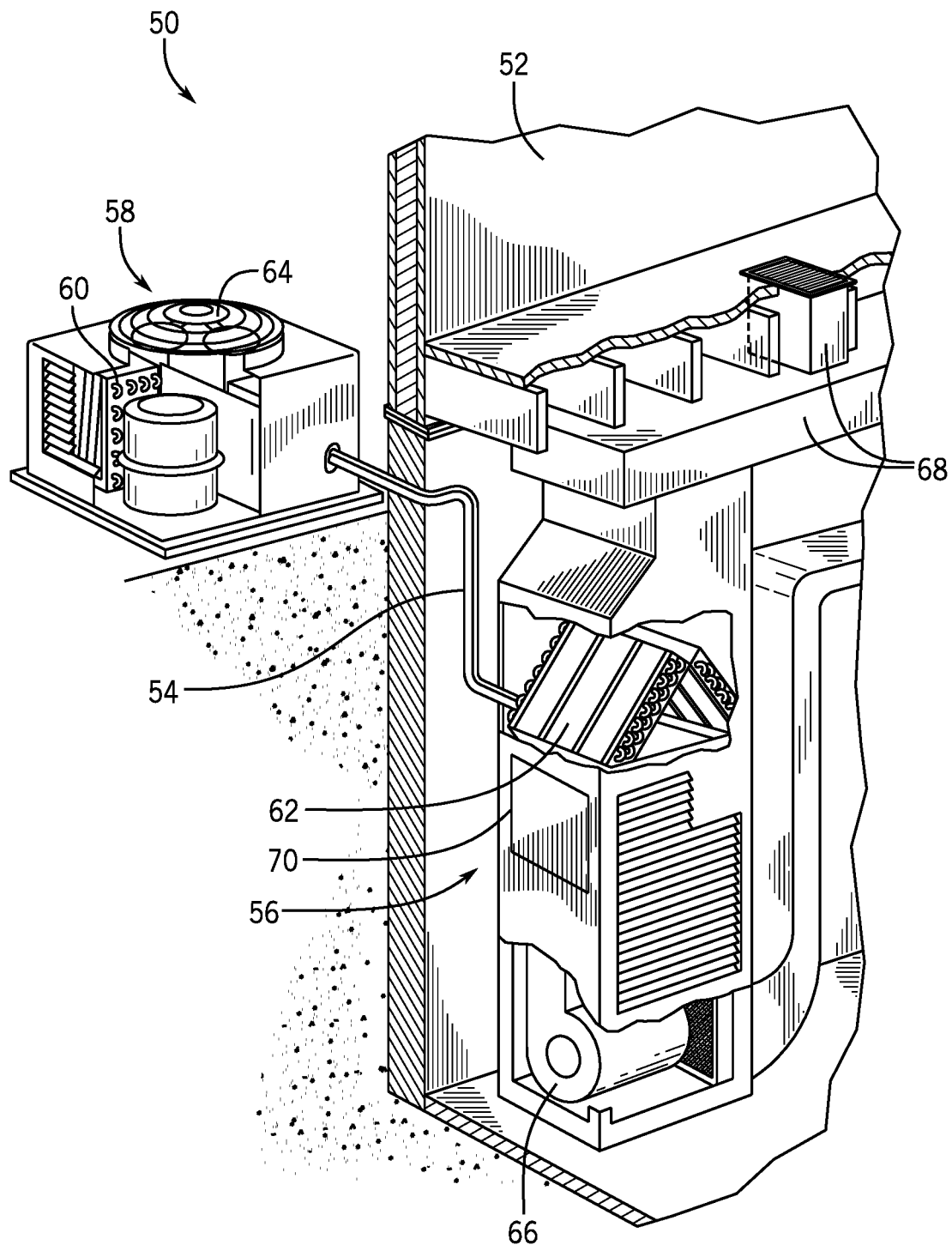
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
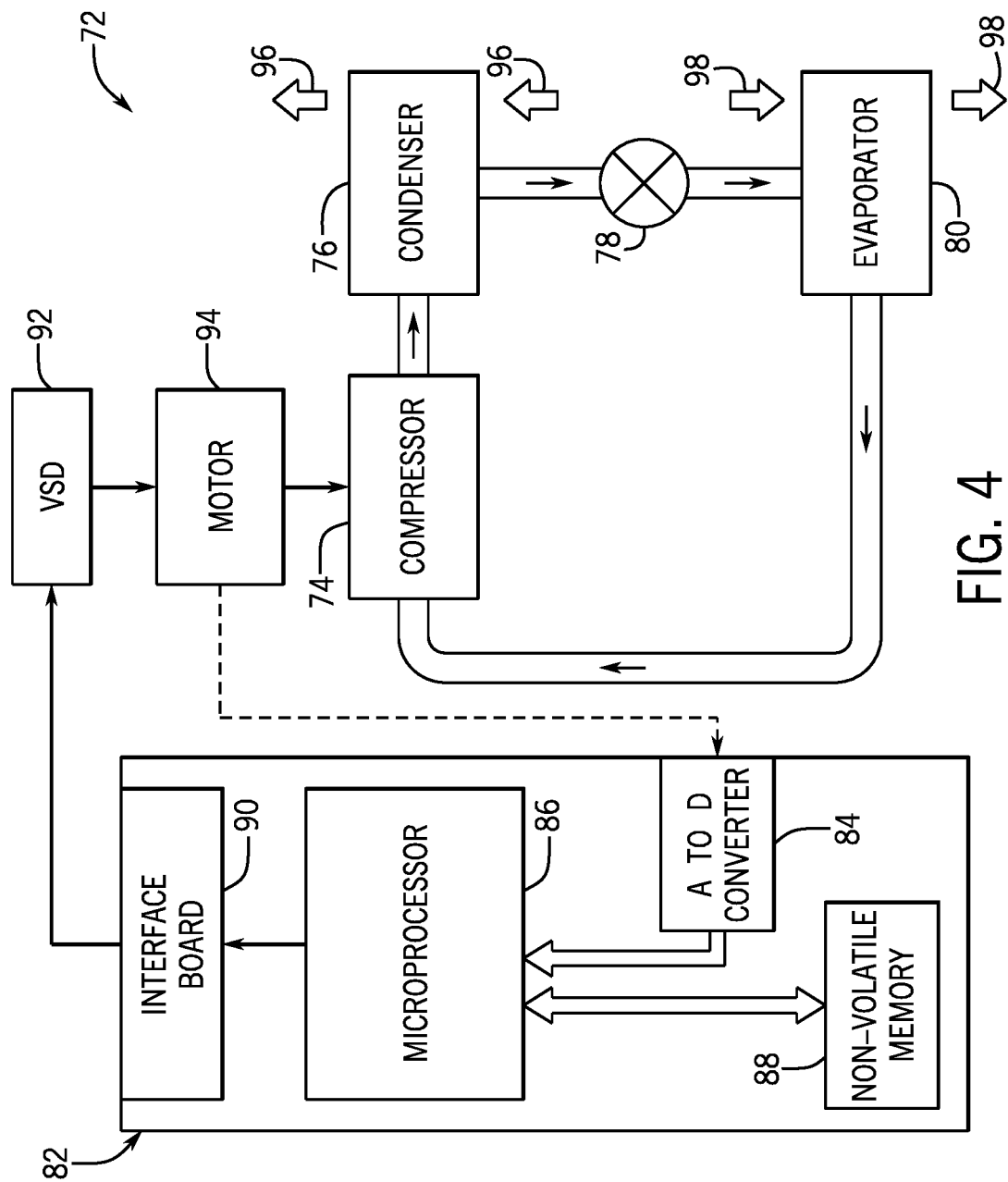
FIG. 4 is a schematic of an embodiment of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
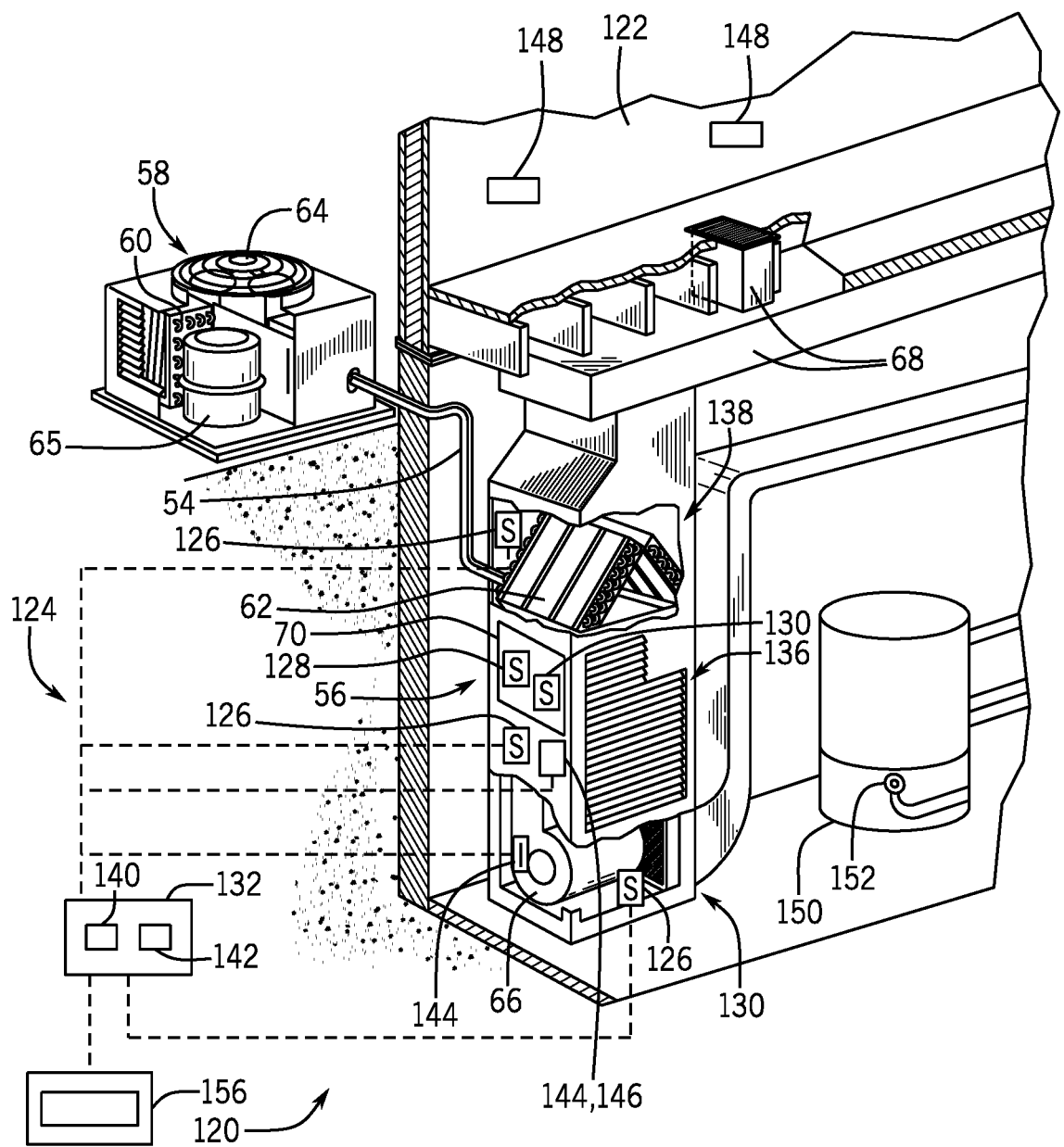
FIG. 5 is a perspective view of an embodiment of an HVAC system, in accordance with an aspect of the present disclosure.

FIG. 5 is a schematic view of an embodiment of a split HVAC system 120 that uses a desired refrigerant. The desired refrigerant being classified as numerically equal to or greater than the refrigerants A2L or B2L according to the ISO 817 refrigerant classification scheme. For example, the refrigerant may be an A2L, B2L, A2, B2, A3, or B3 refrigerant according to the ISO 817 refrigerant classification scheme. Because the HVAC system 120 uses a refrigerant to cool an enclosed space 122, the HVAC system 120 includes an HVAC control system 124. The HVAC control system 124 blocks and/or reduces combustion of the refrigerant in the event the refrigerant leaks and/or is released. Examples of an enclosed space 122 include a home, apartment, or office building.

The HVAC system 120 may be a split system with refrigerant conduits 54 that couple the indoor unit 56 to the outdoor unit 58. The refrigerant conduits 54 transfer the refrigerant between the indoor unit 56 and the outdoor unit 58, primarily transferring liquid refrigerant in one direction and vaporized refrigerant in an opposite direction.

As discussed above, the heat exchanger 60 in the outdoor unit 58 serves as a condenser for re-condensing vaporized refrigerant flowing from the indoor unit 56 to the outdoor unit 58 via one of the refrigerant conduits 54, while the heat exchanger 62 of the indoor unit 56 functions as an evaporator. During operation, the liquid refrigerant in the heat exchanger 62 absorbs energy causing it to evaporate. After passing through the heat exchanger 62, the evaporated refrigerant is redirected to the outdoor unit 58 where the fan 64 draws air over the heat exchanger 60 enabling the vaporized refrigerant to condense by rejecting heat to the atmosphere. The heat transfer cycle then begins again as the liquid refrigerant is pumped by the compressor 65 back to the heat exchanger 62 where it absorbs energy from air blown by the blower 66. After passing over the heat exchanger 62, the cool air is carried through one or more air ducts 68 to various areas of the enclosed space 122.

In some embodiments, the indoor unit 56 may include a heating system, such as the furnace system 70. The furnace system 70 may include a heating component, such as a burner assembly, and a heater, such as a heat exchanger, among other components. In some embodiments, the furnace system 70 combusts a fuel, such as natural gas, to generate heat. The combustion products may pass through tubes or piping in a heat exchanger, separate from heat exchanger 62, such that air directed by the blower 66 passing over the tubes or pipes of the heat exchanger absorbs heat from the combustion products. The heated air may then be routed from the furnace system 70 to the ductwork 68 for heating the enclosed space 122. In some embodiments, the furnace system 70 may not combust a fuel, but may instead use electrical energy to heat air blown by the blower 66. For example, the heater and/or heating component may be an electric resistance-heating coil.

Unfortunately, HVAC systems may leak refrigerant. Accordingly, the HVAC system 120 includes an HVAC control system 124 that blocks and/or reduces combustion of the refrigerant. The HVAC control system 124 may include one or more sensors 126 capable of sensing or detecting the presence of the refrigerant, one or more infrared sensors 128 capable of detecting the temperature of components in the furnace system 70, and/or one or more airflow sensors 130 that detect airflow through the furnace system 70. The types of sensors 126 used to detect the refrigerant may include electrochemical sensors, catalytic bead sensors, photoionization sensors, semiconductor sensors, ultrasonic sensors, and holographic sensors, among others. The infrared sensors 128 may detect temperatures in the furnace system 70 that may potentially combust the refrigerant. For example, the infrared sensors 128 may detect hotspots. The airflow sensors 130 may be flowrate sensors and/or pressure sensors configured to detect when the airflow through the furnace system 70 falls below a threshold level or set point. If the airflow through the furnace system 70 drops below a threshold level or set point, the temperature of components in the furnace system 70, or portions thereof, may increase above a threshold temperature or set point. In other words, insufficient airflow through the furnace system 70 reduces heat transfer from components of the furnace system 70, which may enable them to increase in temperature above a threshold temperature or set point. Accordingly, monitoring the airflow through the furnace system 70 enables the HVAC control system 124 to shut down the furnace system 70 before the temperatures of one or more components in the furnace system 70 increases above a threshold level or set point.

A controller 132 receives signals or feedback from the sensors 126, 128, and 130. As illustrated, the sensors 126 may be in various locations. For example, the HVAC control system 124 may include sensors 126 in the indoor unit 56. In some embodiments, the indoor unit 56 includes a sensor 126 in a blower compartment 134, a furnace compartment 136, and in a heat exchanger compartment 138. The sensors 126 may therefore be in the same compartment as the heat exchanger 62, as well as upstream and/or downstream from the heat exchanger 62. However, the type, location, and number of sensors 126 may vary depending on the embodiment. As discussed in detail below, the infrared sensors 128 may also be positioned at various locations in the furnace system 70. Similarly, the airflow sensors 130 may be positioned at various locations in the HVAC system 120, including upstream and/or downstream of the furnace system 70 or within the furnace system 70 to detect airflow.

The controller 132 may include a processor 140 and a memory 142 used in processing one or more signals from one or more sensors 126, 128, and/or 130. For example, the processor 140 may be a microprocessor that executes software to control the HVAC control system 124. The processor 140 may include multiple microprocessors, one or more "general-purpose" microprocessors, one or more special-purpose microprocessors, and/or one or more application specific integrated circuits (ASICS), or some combination thereof. For example, the processor 140 may include one or more reduced instruction set (RISC) processors.

The memory 142 may include a volatile memory, such as random access memory (RAM), and/or a nonvolatile memory, such as read-only memory (ROM). The memory 142 may store a variety of information and may be used for various purposes. For example, the memory 142 may store processor executable instructions, such as firmware or software, for the processor 140 to execute. The memory may include ROM, flash memory, a hard drive, or any other suitable optical, magnetic, or solid-state storage medium, or a combination thereof. The memory may store data, instructions, and any other suitable data.

In operation, the controller 132 receives one or more signals indicative of the concentration of refrigerant from one or more sensors 126. In some embodiments, the controller 132 compares the detected concentration of refrigerant to a threshold concentration to determine whether the detected concentration of refrigerant is capable of combustion. If the concentration is incapable of combustion, the controller 132 may continue monitoring feedback from the sensors 126. However, if the concentration is capable of combustion, the controller 132 may control one or more flow management devices to reduce and/or block combustion of the refrigerant. In certain embodiments, the flow management devices may include power switches 144 and/or gas valves 146 to reduce and/or block combustion of the refrigerant from an energy source. For example, the controller 132 may activate a switch 144 to turn off one or more electric resistance-heating coils or shutoff the flow of gas to a furnace system 70. In certain embodiments, the switch 144 may substantially limit, block, or completely prevent a flow of electricity to the electric resistance-heating coils. For example, the switch 144 may be opened to break an electric flow path between a power source and the electric resistance-heating coil. In certain embodiments, the gas valve 146 may be operated to substantially limit, block, or completely prevent a flow of gas or other fuel from a power or fuel source to the furnace system 70. For example, the gas valve 146 may be closed to seal off a flow of fuel or gas to the furnace system 70. In this way, the controller 132 is able to reduce the temperature in the furnace system 70 or other heating system of the HVAC system.

The controller 132 may also receive one or more signals indicative of a temperature in the furnace system 70 with one or more infrared sensors 128. In operation, the infrared sensors 128 detect the temperature of electric resistance-heating coils in an electric-based furnace system 70 or the temperature of a heat exchanger in a gas-based furnace system 70. As the controller 132 receives the signals, the controller 132 compares the signals indicative of a temperature to a threshold temperature or set point. In some embodiments, the threshold temperature is approximately the temperature at which the refrigerant combusts. In another embodiment, the threshold temperature or set point is a temperature less than the combustion temperature of the refrigerant. If the detected temperature exceeds the threshold temperature or set point, the controller 132 may then shut off the flow of electricity or gas, depending on the type of furnace system 70. By shutting off the flow of electricity or gas, the furnace system 70 reduces the temperature of the components in the furnace system 70, and thus the possibility of combusting leaking refrigerant. For example, the controller 132 may activate a switch 144 to turn off one or more electric resistance-heating coils or shut off the flow of gas to a furnace system 70. However, if the temperature is less than the threshold temperature or set point, the controller 132 continues to monitor feedback from the one or more infrared sensors 128.

The controller 132 may also receive one or more signals indicative of an airflow in the furnace system 70 with one or more airflow sensors 130. The airflow sensors 130 may be pressure sensors and/or flowrate sensors that enable the controller 132 to detect the amount of airflow through the furnace system 70. As explained above, if the airflow through the furnace system 70 drops below a threshold level or set point, the temperature of components in the furnace system 70 may increase above a threshold temperature or set point. In other words, insufficient airflow through the furnace system 70 reduces heat transfer from components of the furnace system 70 enabling them to increase in temperature above a threshold temperature or set point. Accordingly, monitoring the airflow through the furnace system 70 may enable shutdown of the furnace system 70 before the temperatures of components in the furnace system 70 increase above a threshold level or set point. And in response to the detected airflow, the controller 132 is able to shut down the flow of electricity or gas and thus reduce possible combustion of leaking refrigerant. For example, the controller 132 may activate a switch 144 to turn off one or more electric resistance-heating coils in the furnace system 70. The controller 132 may also shut off the flow of gas to a furnace system 70 containing a burner and thus reduce the temperature of the heat exchanger. However, if the airflow is greater than or equal to the threshold airflow level or set point, the controller 132 continues to monitor feedback from the one or more airflow sensors 130.

In some embodiments, the controller 132 may communicate through wireless and/or wired networks with an electronic device 156. That is, the controller 132 may provide updates and/or receive input from a user through the electronic device 156. The electronic device 156 may be a cell phone, laptop, smart thermostat, tablet, watch, or the like. For example, the controller 132 may provide a warning to a user that refrigerant is leaking from the HVAC system 120, that temperatures in the furnace system 70 are above a threshold level or set point, and/or that airflow through the HVAC system 120 is below a threshold level or set point. The warning may be provided in a variety ways including as a written message on a display of electronic device 156, an audio message, a warning sound, flashing lights, or combinations thereof.

In some embodiments, the controller 132 may request feedback from the user through the electronic device 156. The feedback may include confirming shutoff of electrical power and/or gas flow to the furnace system 70. The electronic device 156 may also enable a user to change the threshold concentration of refrigerant used to determine whether combustion of the refrigerant is possible and/or likely, change the threshold temperature, and/or change threshold airflow values.

Figure 6:
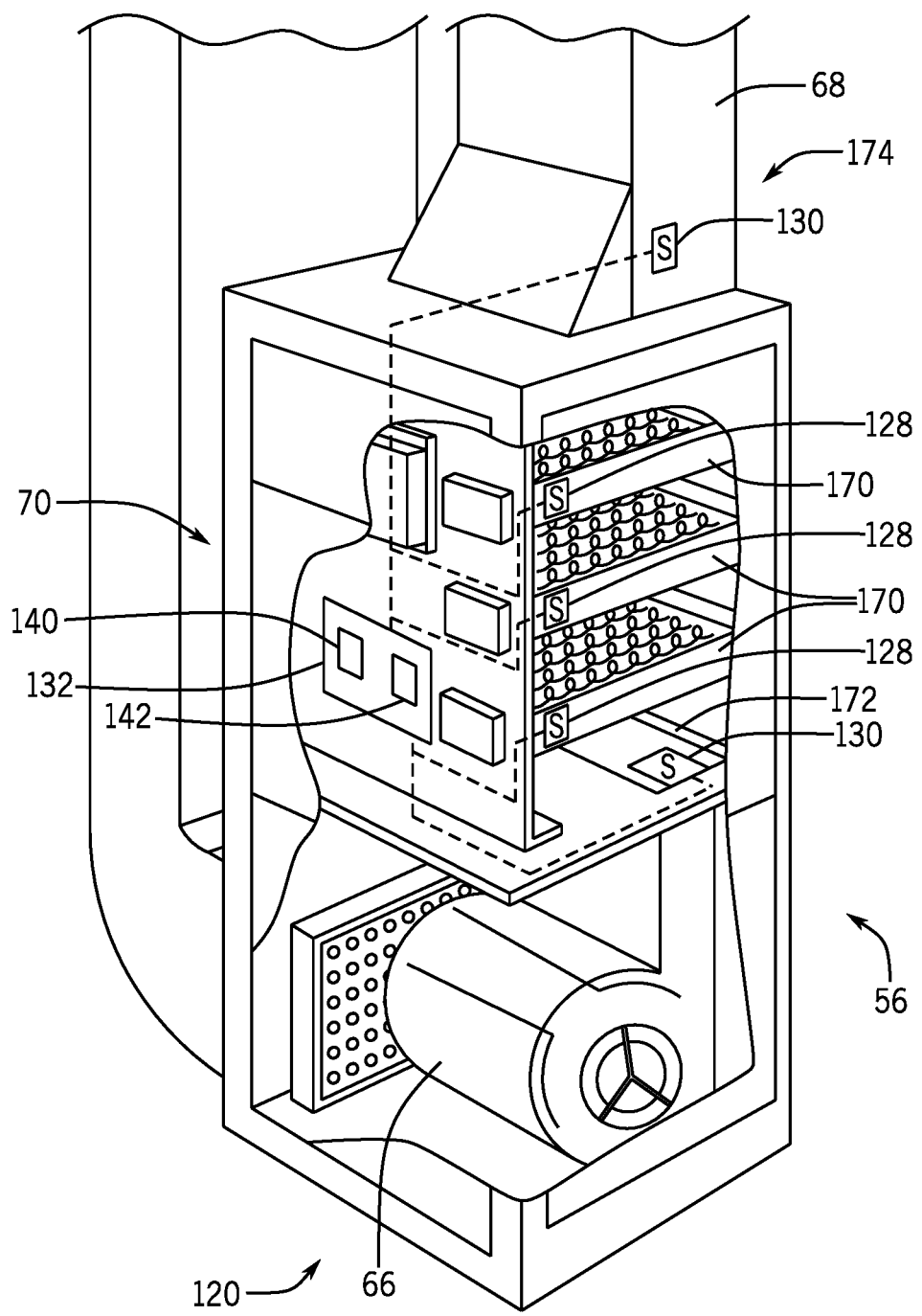
FIG. 6 is a perspective view of an embodiment of an HVAC system, in accordance with an aspect of the present disclosure.

FIG. 6 is a perspective view of an embodiment of the HVAC system 120. The HVAC system 120 includes a furnace system 70 that includes one or more electric resistance-heating coils 170 that heat air for the enclosed space 122, when the HVAC system 120 is operating in a heating mode. In operation, the blower or fan 66 forces air through the furnace system 70, where the air is heated by the electric resistance-heating coils 170.

In order to block combustion of potentially leaking refrigerant in the indoor unit 56, the HVAC system 120 includes infrared sensors 128 that detect the temperature of the electric resistance-heating coils 170. The controller 132 receives feedback signals from the sensors 128 and then compares them to a threshold temperature level. In some embodiments, the threshold temperature is approximately the temperature at which the refrigerant combusts. In another embodiment, the threshold temperature is a temperature less than the combustion temperature of the refrigerant. If the detected temperature of the furnace component exceeds the threshold temperature, the controller 132 may shutoff the flow of electricity to one or more of the electric resistance-heating coils 170. For example, the HVAC system 120 may include multiple electric resistance-heating coils 170 and one or more infrared sensors 128 that monitor the temperature of the electric resistance-heating coils 170. However, not all of the electric resistance-heating coils 170 may exceed the threshold temperature during operation. Accordingly, the controller 132 may turn off the particular electric resistance-heating coils 170 that exceed the threshold temperature, while allowing electric resistance-heating coils 170 to continue heating. In some embodiments, the controller 132 may again turn on the overheated electric resistance-heating coil 170 once it sufficiently cools. However, in some embodiments, all of the electric resistance-heating coils 170 may be turned off in response to detection of a single electric resistance-heating coil 170 exceeding the temperature threshold.

The infrared sensors 128 may be positioned at different locations in the furnace system 70. For example, the infrared sensors 128 may be positioned toward known hotspots on the electric resistance-heating coils 170 that may exceed the threshold temperature. That is, the HVAC system 120 may not include infrared sensors 128 capable of viewing or detecting every portion of the electric resistance-heating coils 170. However, in some embodiments many or all portions of the electric resistance-heating coils 170 may be monitored by the infrared sensors 128.

In some embodiments, the HVAC system 120 may include one or more airflow sensors 130. The airflow sensors 130 may be pressure sensors and/or flowrate sensors that enable the controller 132 to detect the amount of airflow through the furnace system 70. As explained above, if the airflow through the furnace system 70 drops below a threshold level, the temperature of components in the furnace system 70 may increase above a threshold temperature or set point. In other words, insufficient airflow through the furnace system 70 reduces heat transfer from the furnace system 70 components, thereby enabling portions of the furnace system 70 to increase in temperature above a threshold temperature. Accordingly, monitoring the airflow through the furnace system 70 may enable shutdown of the furnace system 70 before the temperatures of components in the furnace system 70 increase above a threshold level. The airflow sensors 130 may be positioned at various locations in the HVAC system 120. For example, the airflow sensors 130 may be positioned at an inlet 172 to the furnace system 70, an outlet 174 of the furnace system 70, and/or within the furnace system 70.

Figure 7:
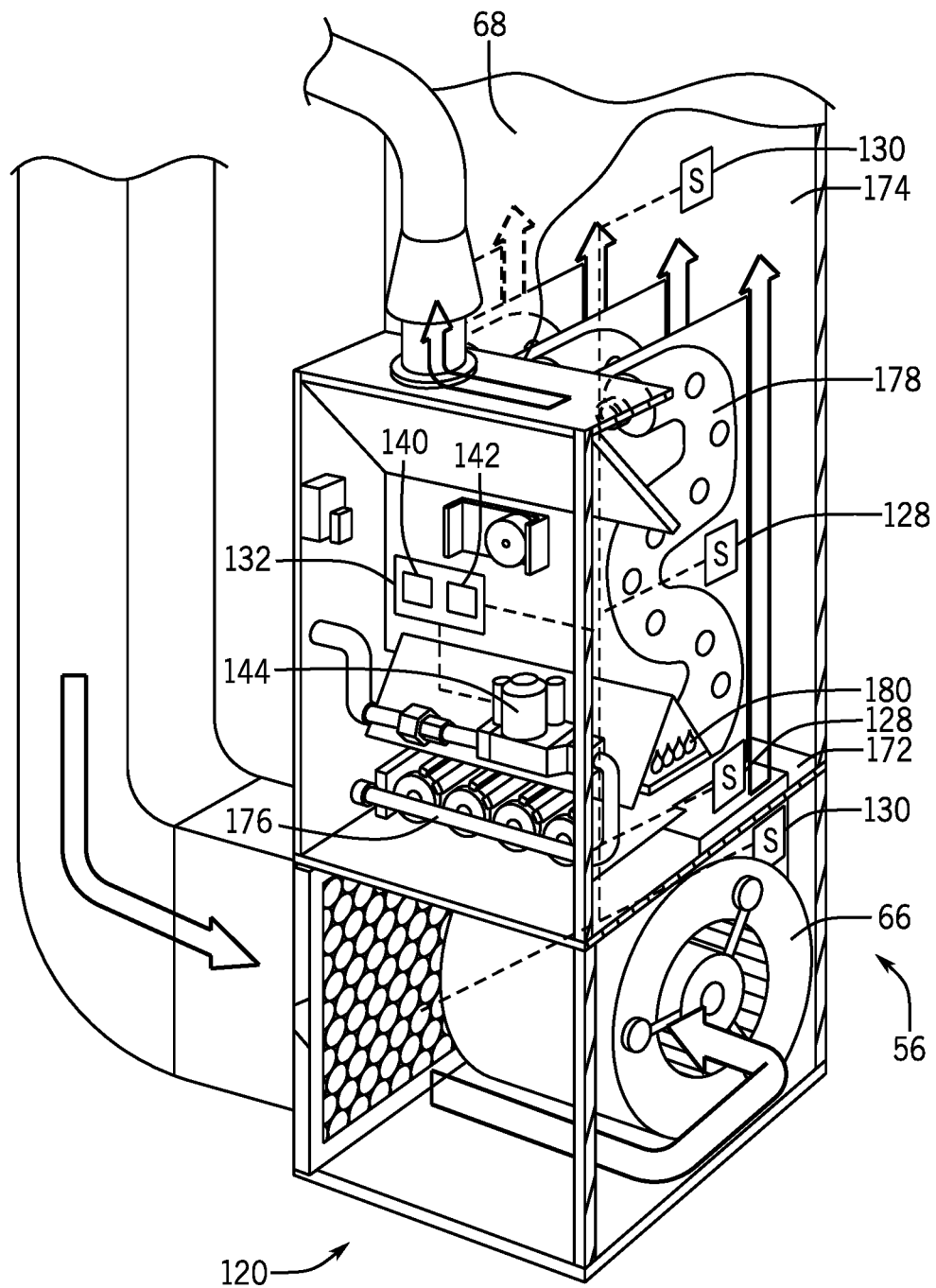
FIG. 7 is a perspective view of an embodiment of an HVAC system, in accordance with an aspect of the present disclosure.

FIG. 7 is a perspective view of an embodiment of the HVAC system 120. The HVAC system 120 includes the furnace system 70 that includes a burner 176 that burns gas, such as natural gas. The heated byproducts of the combustion process flow through tubes or piping in a heat exchanger 178, such that air directed by the blower 66 passes over the tubes or pipes and extracts heat from the combustion products. The heated air may then be routed from the furnace system 70 to the ductwork 68 for heating the enclosed space 122.

In order to block combustion of potentially leaking refrigerant in the indoor unit 56, the HVAC system 120 includes infrared sensors 128 that detect the temperature of the heat exchanger 178. The controller 132 receives these signals and compares the signals indicative of a temperature of the heat exchanger 178 to a threshold temperature. In some embodiments, the threshold temperature being approximately the temperature at which the refrigerant combusts or in another embodiment a temperature less than the combustion temperature of the refrigerant. If the detected temperature of the heat exchanger 178 exceeds the threshold temperature, the controller 132 may shutoff the flow of gas to the burner 176.

The infrared sensors 128 may be positioned at different locations in the furnace system 70 to detect the temperature of the heat exchanger 178. For example, the infrared sensors 128 may be positioned proximate to known hotspots on the heat exchanger 178 that may potentially exceed the threshold temperature. That is, the HVAC system 120 may not include infrared sensors 128 capable of viewing every portion of the heat exchanger 178. For example, the infrared sensors 128 may be positioned proximate to the inlet section 180 of the heat exchanger 178. During operation, the inlet section 180 of the heat exchanger 178 receives the combustion products at their highest temperatures. Accordingly, the inlet section 180 of the heat exchanger 178 may be the hottest portion of the heat exchanger 178. Infrared sensors 128 may therefore be positioned in such a way as to detect the temperature of the inlet section 180 to determine if the heat exchanger 178 exceeds the threshold temperature.

In some embodiments, the HVAC system 120 may include one or more airflow sensors 130. The airflow sensors 130 may be pressure sensors and/or flowrate sensors that enable the controller 132 to detect the amount of airflow through the furnace system 70, and thus across the heat exchanger 178. As explained above, if the airflow through the furnace system 70 drops below a threshold level, the temperature of components in the furnace system 70 may increase above a threshold temperature. In other words, insufficient airflow through the furnace system 70 reduces heat transfer from the heat exchanger 178 enabling it to increase in temperature above a threshold temperature. Accordingly, monitoring the airflow through the furnace system 70 may enable shutdown of the furnace system 70 before the temperatures of components in the furnace system 70 increase above a threshold level capable of combusting a leaking refrigerant.

Only certain features and embodiments of the disclosure have been illustrated and described, many modifications and changes may occur to those skilled in the art, such as variations in sizes, dimensions, structures, shapes and proportions of the various elements, or values of parameters, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed subject matter. It should be appreciated that in the development of any such actual implementation, as in any engineering or design project, numerous implementation specific decisions may be made. Such a development effort might be complex and time consuming, but would be a routine undertaking of design, fabrication, and manufacture for those of ordinary skill having the benefit of this disclosure, without undue experimentation.

The invention claimed is:

1. A controller of a heating, ventilation, and air conditioning (HVAC) system, wherein the controller is configured to:
   receive a signal indicative of an amount of airflow through a heating component of the HVAC system from a sensor of the HVAC system;
   compare the signal indicative of the amount of airflow to a threshold; and
   operate a flow management device to block a flow of electricity or fuel to the heating component based on comparison of the signal indicative of the amount of airflow to the threshold.

2. The controller of claim 1, wherein the controller is configured to receive, from a temperature sensor of the HVAC system, a temperature of the heating component.

3. The controller of claim 2, wherein the controller is configured to operate the flow management device to block the flow of electricity or fuel to the heating component based on the temperature exceeding a temperature threshold.

4. The controller of claim 3, wherein the temperature threshold is related to a reaction temperature of a refrigerant of the HVAC system.

5. The controller of claim 4, wherein the refrigerant is an A2L refrigerant.

6. The controller of claim 2, wherein the temperature sensor is an infrared sensor, and the flow management device is a switch configured to block the flow of electricity or fuel to the heating component.

7. The controller of claim 1, wherein the sensor is a flowrate sensor or a pressure sensor.

8. The controller of claim 7, wherein the controller is configured to operate the flow management device to block the flow of electricity or fuel to the heating component based on the amount of airflow falling below the threshold.

9. The controller of claim 1, wherein the sensor is disposed at an inlet or an outlet of a furnace of the HVAC system, and wherein the furnace comprises the heating component.

10. The controller of claim 1, wherein the controller is configured to output a second signal to actuate the flow management device to block the flow of electricity or fuel to the heating component.

11. A heating, ventilation, and air conditioning (HVAC) system, comprising:
    a heating component configured to heat an airflow directed through the HVAC system;
    a sensor configured to detect an operating parameter of the airflow directed through the HVAC system and to emit a signal indicative of the operating parameter of the airflow;
    a switch or valve configured to limit a flow of electricity or fuel to the heating component; and
    a controller configured to:
       receive the signal indicative of the operating parameter of the airflow;
       compare the signal indicative of the operating parameter of the airflow to a threshold value; and
       actuate the switch or valve to limit the flow of the electricity or fuel to the heating component based on comparison of the signal indicative of the operating parameter of the airflow to the threshold value, wherein the operating parameter is an amount of the airflow directed through the HVAC system.

12. The HVAC system of claim 11, wherein the sensor is a flowrate sensor or a pressure sensor.

13. The HVAC system of claim 11, wherein the sensor is a first sensor, and the HVAC system comprises a second sensor communicatively coupled to the controller and configured to detect an additional operating parameter indicative of a temperature of the heating component.

14. The HVAC system of claim 13, wherein the controller is configured to actuate the switch or valve to limit the flow of the electricity or fuel to the heating component based on the additional operating parameter indicative of the temperature of the heating component.

15. The HVAC system of claim 14, wherein the threshold value is a first threshold value, and the controller is configured to:
    compare the additional operating parameter indicative of the temperature to a second threshold value, wherein the second threshold value is related to a reaction temperature of a refrigerant of the HVAC system; and
    actuate the switch or valve to limit the flow of the electricity or fuel to the heating component based on comparison of the additional operating parameter indicative of the temperature to the second threshold value.

16. A controller for a heating, ventilation, and air conditioning (HVAC) system, wherein the controller is configured to perform operations comprising:
    receiving, via a sensor, a first signal indicative of a temperature of a heating component of a furnace system of the HVAC system, wherein the heating component is configured to heat an airflow;
    comparing the first signal indicative of the temperature an to a threshold value; and
    outputting a second signal to actuate a flow management device of the furnace system to block flow of electricity or fuel to the heating component of the furnace system based on comparison of the temperature to the threshold value.

17. The controller of claim 16, wherein the sensor is an infrared sensor.

18. The controller of claim 16, wherein the operations comprise:
    receiving, via an additional sensor, a third signal indicative of an amount of the airflow directed through the furnace system; and
    outputting the second signal to actuate the flow management device of the furnace system to block the flow of electricity or fuel to the heating component of the furnace system based on an additional comparison of the third signal indicative of the amount of the airflow to an additional threshold value.

19. The controller of claim 16, wherein the controller is configured to execute processor executable instructions to perform the operations.

20. The controller of claim 16, wherein the operations comprise:
    receiving, via an additional sensor, a third signal indicative of a presence of refrigerant of the HVAC system within the furnace system; and
    outputting the second signal to actuate the flow management device of the furnace system to block the flow of electricity or fuel to the heating component of the furnace system based on the third signal.

\* \* \* \* \*